Dec. 8, 1959    S. F. ANDERSON ET AL    2,915,865
BAR FORMING AND WRAPPING MACHINE
Filed July 7, 1954    7 Sheets-Sheet 2

Inventors
Swan F. Anderson
& Ralph F. Anderson
By McCanna and Morsbach
Attys.

Dec. 8, 1959  S. F. ANDERSON ET AL  2,915,865
BAR FORMING AND WRAPPING MACHINE
Filed July 7, 1954  7 Sheets-Sheet 3

Inventors
Swan F. Anderson
Ralph F. Anderson
By McCanna and Morsbach
Attys.

Dec. 8, 1959  S. F. ANDERSON ET AL  2,915,865
BAR FORMING AND WRAPPING MACHINE
Filed July 7, 1954  7 Sheets-Sheet 5

Inventors
Swan F. Anderson
& Ralph F. Anderson
By McCanna and Morsbach
Attys.

United States Patent Office 2,915,865
Patented Dec. 8, 1959

2,915,865

BAR FORMING AND WRAPPING MACHINE

Swan F. Anderson and Ralph F. Anderson, Rockford, Ill.

Application July 7, 1954, Serial No. 441,756

40 Claims. (Cl. 53—122)

This invention relates to a machine for forming and wrapping bars from plastic material capable of flowing under pressure. The machine is suitable for use with a wide variety of materials, but inasmuch as it has been developed specifically for the handling of ice cream, it will be herein described as applied to this material, though it will be understood that the invention is not to be limited thereto. The illustrated embodiment comprises a machine for extruding a ribbon-like web of ice cream in plastic or semi-plastic condition as it emerges from a continuous freezer, severing the web into bars and enclosing the bars between covers or wafers which cover at least the two opposed surfaces of the bar to enable the bars to be handled without contact of the fingers with the ice cream of the bar.

An important object of the invention is the provision of a machine for forming covered bars from a continuously flowing stream of plastic material.

Another object of the invention is the provision of a machine adapted to produce a continuous ribbon-like web of plastic material, feed covers or other wrappers into a position beside the advancing ribbon adjacent the end of the web, move the covers or wrapper laterally with respect to the web to shear a bar of selected size from the end thereof, and thereafter at least partially further enclose the bar.

A still further object is the provision of a machine for forming a wrapping having spaced covers and an open side, extruding a continuously flowing ribbon of plastic material through the open side to fill the space between the covers and moving the filled wrapper transversely of the ribbon to shear the same along the top of the covers.

Another object of the invention is the provision of an improved machine arranged to form a wrapper from a roll of wrapping material, interpose the wrapper in the path of a flowing ribbon of plastic material to fill the same, move the wrapper laterally of the ribbon to shear off the end portion of the ribbon along the edge of the wrapper and thereafter close and eject the wrapped bar.

A further object of the invention is the provision of a machine for forming and covering bars in rapid sequence from a continuous flowing stream of plastic material wherein novel means are provided for performing the various functions including novel driving and timing means.

Other objects and advantages will become apparent from the following description and accompanying drawings, in which.

Directing attention first to Figs. 1 through 4, the operating elements of the machine are mounted on a cabinet or housing which forms the frame structure, the housing having a front wall 16, end walls 17 and 18 and a rear wall 19, all of which extend in an upright fashion from a base 21 (Fig. 4) which in this instance is intended to rest upon the floor. The side walls 17 and 18 have inturned flanges 22 to which the wall 19 is removably attached and which serve to support certain operating parts of the structure. The housing has a cover 23 which rests down over the upstanding walls and permits of easy access to the interior of the housing for lubrication or adjustment.

The present embodiment, being intended for the handling of comestibles and particularly ice cream and the like, the portions of the device which may come into contact with the ice cream or the wrapping material, are mounted on the exterior face of the front panel 16, a heavy section metal plate 15 is secured to the front panel within the housing (see Fig. 4), whereas the drive mechanism functioning to drive the various instrumentalities is housed within the housing. This prevents contamination of the drive mechanism by the ice cream, prevents contamination of the product from lubricant used in lubricating the drive mechanism, and also permits the portion of the machine coming in contact with the comestibles to be washed and sterilized by means of running water and steam without disturbing the lubrication of the drive parts.

The ice cream, in semi-liquid or plastic form is supplied to the machine preferably directly from an ice cream freezer. To this end a bracket 24 is secured to the face of the housing and has an upstanding tube section 25 integral therewith threaded at its upper end for attachment to the outlet of the freezer. An extrusion nozzle 26 having an attachment flange 27 is bolted to the lower face of the bracket 24 to receive the ice cream from the tube section 25. The nozzle 26 is rectangular in horizontal cross-section as best seen from Fig. 18 so that the ice cream delivered thereto under pressure from the freezer or other source is caused to emerge from the open lower end of the nozzle in the form of a ribbon-like web. The size or shape of the ribbon may be varied by substituting nozzles of different shape for that herein shown. Disposed below and in spaced relation to the lower end of the nozzle is a bottom plate 28 which is supported on spaced arms 29 (Fig. 2) secured to the front panel 16, the plate serving to support the bar during its formation and while being transported through the machine. Mounted in the housing and extending through the front panel is a shaft 31 carrying a sprocket 32 on the forward end thereof in spaced relation to the panel, a chain 33 being trained over the sprocket, extending across the bottom plate 28 and trained over an idler sprocket 34 adjacent the opposite side of the panel, the idler sprocket being mounted on a shaft carried in a bearing 35 (Fig. 3) secured to the front panel. Cross bars 36 are welded or otherwise secured to the chain in equally spaced relation therealong, the bars being attached at one end as shown in Fig. 3 so that the bars ride along the surface of the bottom plate as the chain is driven, covering substantially the entire width of the plate. A stacking tray 37 is disposed forwardly of the bottom plate 28 with its top surface substantially coplanar with the top surface of the plate 28 for the reception of the wrapped bars thereon for stacking purposes, the tray being supported on a forwardly extending bar 38 attached to the front panel 16.

While the covers or other wrapping material may take a number of different forms and the manner of supplying it to the nozzle will vary accordingly, according to the preferred form of the invention a roll of wrapping material such as stiff paper or the like indicated at 39 (Fig. 1) is mounted on a spindle 41 carried on a bracket 42 mounted on the front panel 16, a guide plate 42a being supported between the spindle 41 and a stationary part of the machine, the roll 39 and plate 42a being retained on the spindle by a collar 41a. The sheet from the roll 39 passes between perforating rolls 43 and 44, thence over a guide plate 45 and through a cutter 46 to the conveyer formed by an endless chain 33 and cross bars 36. The perforating rolls are mounted on the front panel 16 by means of a frame structure comprising a plate 47 attached to panel 16 (Fig. 2) and spaced side members 48 interconnected at their outer ends by a support block 49 (see Figs. 1 and 2). The upper perforating wall has a driving shaft 51 which passes through the front panel to be driven in a manner presently to be described and functions as the feed roller for withdrawing the sheet material from the supply roll 39. A bearing for the outer end of the shaft 51 comprises a cap-like bearing member 52 receiving the end of the shaft and in turn being supported in a socket of the support block 49 retained therein by a set screw 53 to permit easy removal of the bearing and perforating roll during cleaning operations and for change of wrapper size or shape. Disposed on the shaft 51 between the elements 47 and 49 is a sleeve 50 having a flange 56 formed at one end and a slot 50a for the reception of a driving cross pin 51a on the shaft 51, and spaced perforating disks 54, which may be either in the form of perforating elements or scoring elements adaped to perforate or score the sheet material along spaced lines as it passes between the rolls, are disposed on the shaft and spaced thereon by spacers 55. The disks and spacers are held in assembled relation by a collar 56a threaded onto the sleeve 50 to compress the disks and spacers between the collar 56a and flange 56.

The lower roll is in the nature of an idler roll and comprises a stationary shaft 57 carrying a roll 58 for rotation thereon provided with grooves 59 spaced to correspond with the perforating disks 54, the roll shaft being adjustable toward and away from the upper roll by means of adjusting screws 66 which act against the sides of flattened shaft ends 60 and 61 which ride in slots 62 and 63 in the elements 47 and 49. The end 60 of the shaft has a knob 64 to facilitate withdrawal of the shaft from its mounting.

Figures 1, 6, 7, 8:
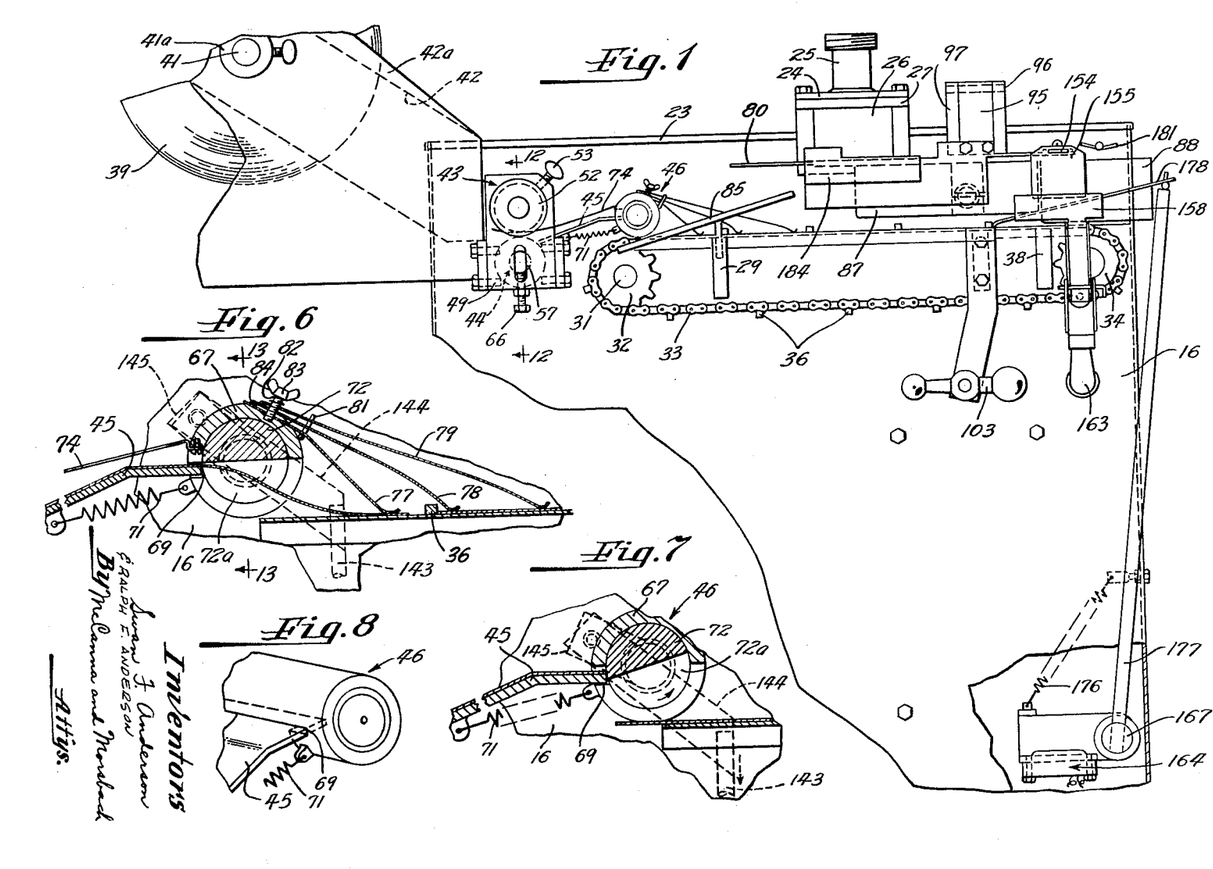
Figure 1 is a front elevational view of a machine embodying the invention certain parts being omitted for clarity.
Figs. 6 and 7 are fragmentary sections on the line 6—6 of Fig. 2.
Fig. 8 is a perspective view of the end of the cutter.
Figures 2, 9, 10:
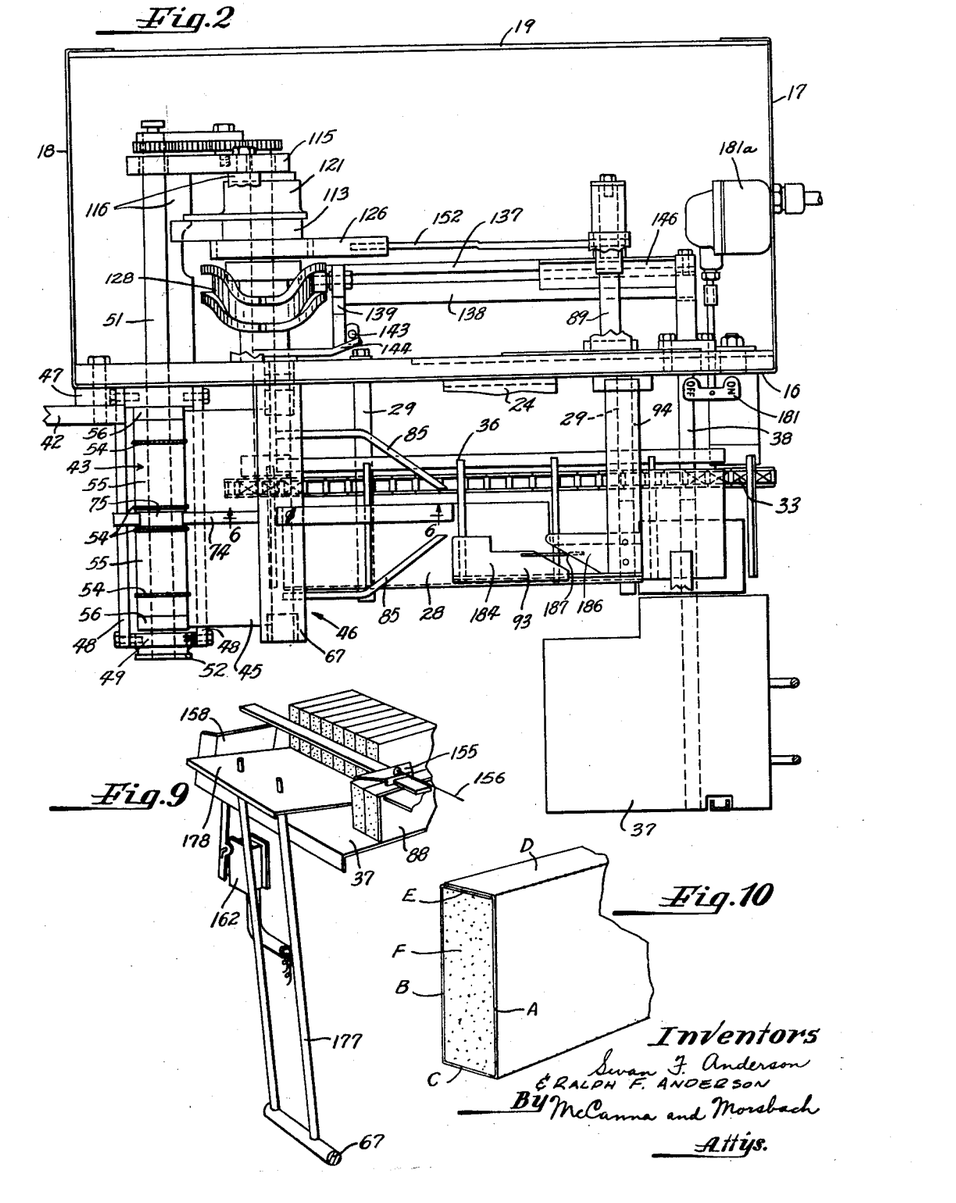
Fig. 2 is a top elevational view thereof, the cover of the housing being removed, certain parts being omitted.
Fig. 9 is a fragmentary view of the stacker and stack ejecting mechanism.
Fig. 10 is a fragmentary view showing a preferred form of wrapped bar.
Figure 3:
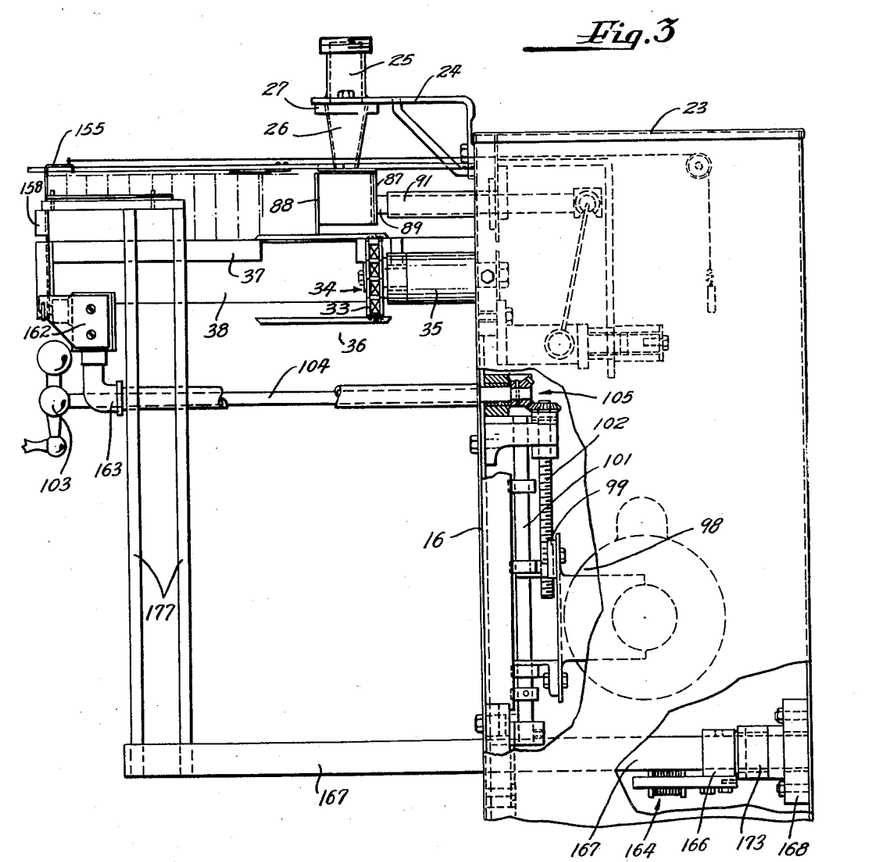
Fig. 3 is an elevational view of the right hand end of the machine facing Figs. 1 and 2.
Figure 13:
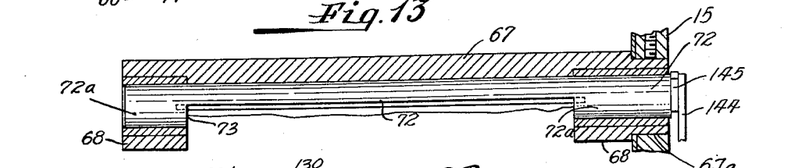
Fig. 13 is a longitudinal section through the cutter taken on the line 13—13 of Fig. 6.

The cutter 46 comprises an outer cylindrical body 67 (Figs. 6 and 13) mounted at one end on the front panel 16 by a bearing portion 67a secured in the plate 15 and the body projecting outwardly therefrom in parallel relation with the perforating rolls and disposed over one end of the conveyor and bottom plate 28 (note Figs. 1 and 2). The lower side of the body is cut away through substantially half of its circumference, for the passage of the sheet of material, leaving cylindrical end bearings 68. Each of these bearings is notched as indicated at 69 (Figs. 6 and 8) for the reception of the sides of the shear plate 45. One edge of the shear plate rests on the top of one of the bars 48, and the plate is held in seated position in the notches 69 by tension springs 71 located adjacent opposite side edges of the plate. The plate 45 serves as a guide for the sheet material from the perforating rollers into the cutter 46. Disposed within the cutter body 67 is a rotary cutter 72 comprising a generally cylindrical bar having cylindrical end portions 72a mounted for rotation within the bearings 68, approximately one-half of the bar being removed as shown at 73 (Fig. 13). The cutter bar extends through the front panel 16 and is rotated through a small amplitude shearing movement by means disposed within the housing. The forward edge of the shear plate 45 rests in shearing relation with one edge of the rotary cutter and the sheet passes through the space between the shoulders 73 of the cutter bar. Attached to the cutter body 67 is a leaf spring member 74 which projects rearwardly over the plate 45 and between the perforating rolls, the upper perforating roll being recessed as indicated at 75 for reception of this leaf spring, and which acts to strip the sheet free of the upper perforating roll.

Figures 16, 17, 18:
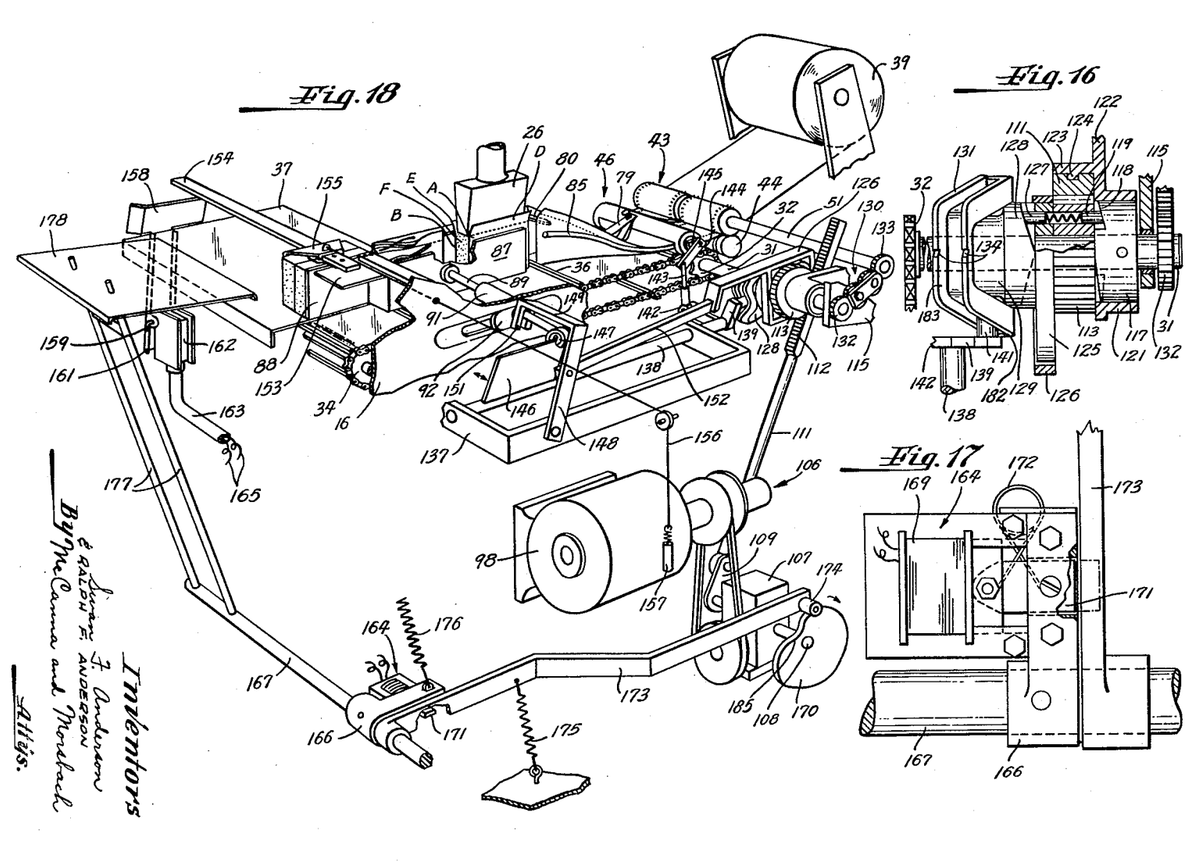
Fig. 16 is an enlarged fragmentary view partly in section showing the cam and ratchet drive mechanism.
Fig. 17 is a fragmentary elevational view showing the solenoid clutch for energizing the stack ejecting member.
Figs. 18 through 24 are skeletonized views showing the operating parts in a succession of positions illustrating various functions of the machine, the supporting structure and housing being removed and various elements being in part diagrammatic.

Attached to the upper side of the cutter body 67 and disposed substantially midway between the edges of material passing through the cutter are a series of fingers 77, 78 and 79 arranged in superimposed relationship on a screw fixed in the body and resiliently held in place by a spring 82 tensioned by a wing nut 83. The screw 81 passes through relatively loose holes adjacent one end of the fingers, and the fingers 78 and 79 have downturned ends as indicated at 84 so that each of the fingers 77 and 78 may have movement independently of each other and of the finger 79. The fingers are held in superimposed alignment by a wire clip 81 loosely encircling the fingers. These fingers bear against the central portion of the wrapping material as it emerges from the cutter and serves to press the central area thereof down against the bottom plate 28 as the sheet is fed out and so that as the conveyor advances after severance of the blank the central portion of the blank will be pressed against the plate between the bars 36 and be carried forward by the cross bars 36. Attached to the supporting bar 29 is a pair of erecting arms 85 each having a rearward portion disposed longitudinally of the travel of the sheet and having ends which converge toward each other, as will be apparent from Figs. 1 and 2. The rearward portion of these arms is disposed in a plane below the advancing sheet so that as the sheet advances the fingers 77—79 retain the center portion of the sheet against the plate while the arms 85 elevate the side portions as shown in Fig. 18 to form a wrapper of U-shaped cross section as the blank advances to a position under the nozzle 26. A tongue 80 is mounted on the nozzle to guide the upper edges of the blank into position along the sides of the nozzle.

A stepped transfer plate is mounted above the bottom plate 28 (see Figs. 1, 3 and 18), the plate having a forming step or portion 87 and a bar stacking step or portion 88. The transfer plate is carried on a rod 89 mounted for reciprocation in a bearing 91 carried on a slide plate 92 (Fig. 4) which is in turn mounted on the front panel and plate 15 of the housing for reciprocation in a horizontal plane. A folder indicated generally at 93 (Figs. 2 and 11) is supported adjacent the forward edge of the bottom plate 28 on the bar 94 which extends across the plate in elevated spaced relation thereto and is arranged in the form of an L-shaped member having an upstanding leg 95 (see Fig. 11) pivotally supported by a pintle 96 positioned at its upper end and carried on an upstanding bracket 97 fixed to the front panel 16, this arrangement enabling the folder to be swung upwardly away from the bottom plate to an inoperative position when the machine is being started or cleaned. As will presently be described more in detail, the forming portion 87 of the transfer plate acts to move the formed bar transversely of the bottom plate across the bottom of the nozzle to a position against a side member 90 of the folder and to retain the bar in this position during certain successive stepped movements of the conveyer while the wrapper is being folded, the bar stacking portion 88 simultaneously acting to move a formed bar off from the bottom plate 28 forwardly into stacked position on the stacking tray 37.

Figures 4, 5:
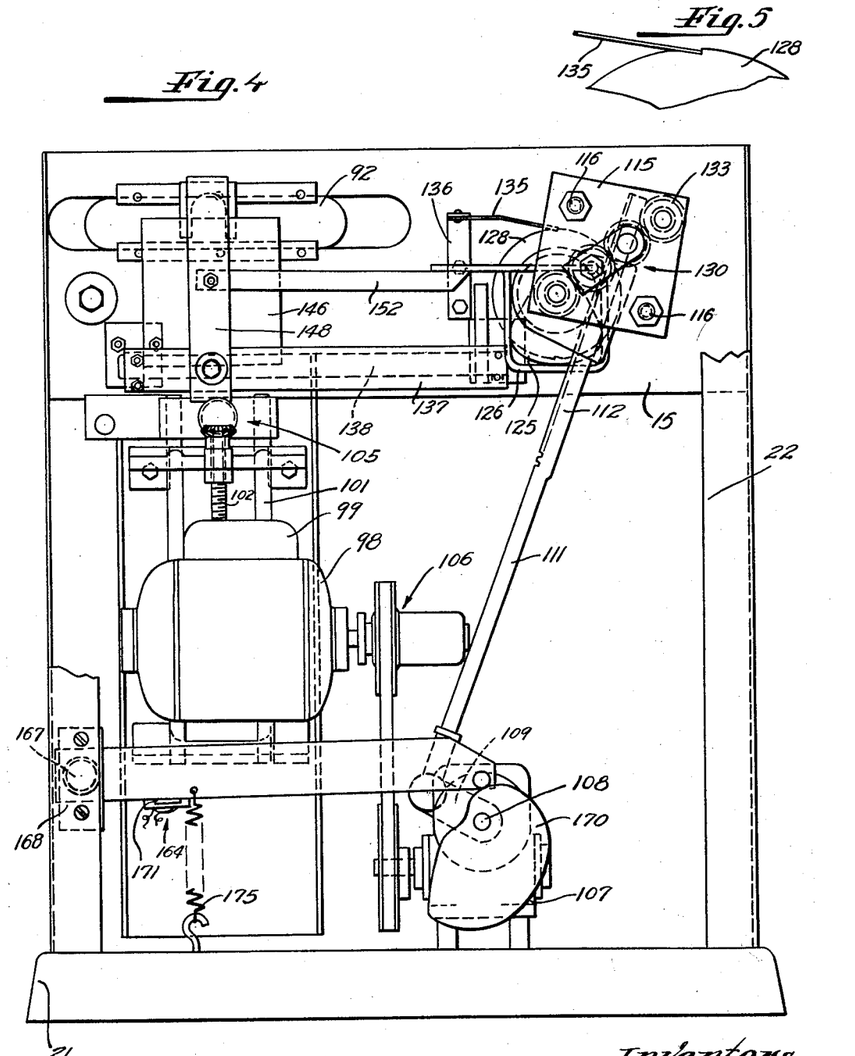
Fig. 4 is an elevational view of the rear of the machine with the back and cover of the housing removed.
Fig. 5 is a fragmentary side elevational view showing the barrel cam and detent.

The driving mechanism for the various bar forming and wrapping devices is, as previously mentioned, enclosed within the housing and includes an electric motor 98 mounted on a platform 99 (Figs. 3 and 4) carried on vertical ways 101 and adjustable thereon by a screw 102 rotated from a crank 103 disposed in front of the front panel 16 and arranged to drive the screw through a shaft 104 and bevel gears 105. The motor carries a variable speed pulley 106 driving a gear box 107 through the usual V-belt drive, the gear box having an output shaft 108, the ends of which project therefrom (Fig. 18). A crank arm 109 is attached to one end of shaft 108 and pivotally carries a rack bar 111 for reciprocation in response to rotation of the shaft and arm, rack 112 being formed on the rack bar. The rack 112 engages a pinion gear 113 supported for rotation on the shaft 31 which also carries the sprocket 32, and projects rearwardly within the housing, the end of the shaft 31 being rotatable in a bracket plate 115 supported on the front panel within the housing by spacer bolts and nuts 116 (Fig. 2 and 4). Fixed to the shaft 31 and disposed between the pinion 113 and the plate 115 is a ratchet cam 117 (Fig. 16) having cam faces 118 cooperable with a spring pressed pin 119 carried in the pinion arranged to rotate the shaft with the pinion when the pinion rotates in a counterclockwise direction facing Figs. 18 through 23 and to permit the pinion to rotate with respect to the shaft when the pinion is driven in a counterclockwise direction by the rack 112. The ratchet cam 117 is enclosed within a housing 121 having an arm 122 forked over one of the spacer members 116 to prevent rotation. The housing has a laterally disposed lug 123 against which the upper end of the bar 111 rests and which serves to retain the rack in engagement with the pinion. The lug 123 has a rib 124 received within a groove on the rear side of the rack to guide the upper end of the rack bar.

A cam 125 is fixed to the opposite side of the pinion 113 and acts to reciprocate a box-like cam follower 126 for a purpose presently to be described. The cam has an opening carrying a spring pressed ratchet pin 127 cooperating with a ratchet cam 128 having an abutment face oppositely disposed from that on the cam 117 so that the ratchet cam 128 is rotated with the pinion 113 when the pinion rotates in a clockwise direction facing Fig. 18. The ratchet cam 128 is part of a cam member having a body member 129 rotatably carried on the shaft 31 and having an annular cam track 131 fixed to the body member forming a barrel cam. A gear 132 is fixed on the shaft 31 and cooperates with a changeable gear 133 mounted on the shaft 51 within the housing through intermediate gears 130, the gears serving to drive the upper perforating roll in response to rotation of the pinion 113 in one direction only. The gears 133 are readily changeable to permit the length of the wrapper to be changed for different sized bars. The gears 130 are carried on a bar 130a secured to the plate 115 by a cap screw 130b so that the plate may be rotated thereabout to accommodate different sized gears at 133. Notches 134 are provided in the cam track at spaced intervals and the end of detent comprising a flat leaf spring 135 (Fig. 5) rides the periphery of the track, dropping into the notches at the required interval to prevent counterclockwise movement of the cam member when the pinion moves in this direction. The leaf spring is mounted at its opposite end on a bracket 136 fixed to the front panel.

A rectangular bracket 137 (Fig. 18) is affixed to the rear side of the front wall 16 and carries a rotatable rod 138 which is journaled in the bracket adjacent its opposite ends. A crank 139 is secured to one end of the rod 138 adjacent the cam track 131 and carries a roller 141 forming a cam follower disposed within the groove of the cam track. The crank 138 carries an arm 142 extending toward the front wall pivoted to a link 143 attached to one end of a lever 144, the opposite end of the lever being secured to a crank 145 attached to the end of the cutter 72 and acting to rotate the cutter.

A plate 146 is mounted on the rod 138 to rotate therewith, the upper edge of the plate being received in a slot of a follower 147 attached to the end of the rod 89 whereby rotation of the rod 138 and the plate 146 acts to reciprocate the rod 89 longitudinally of its axis. A slide drive member has a leg 148 pivoted to the frame 137 and extending upwardly therefrom, a portion 149 extending across the frame and a depending fork 151 which straddles the rod 89. Pivotally attached to the arm 148 is a drive arm 152 extending longitudinally of the frame 137, the opposite end of the drive arm being secured to the box-like cam follower 126 whereby the arm 152 is driven in a reciprocating motion to rock the arm 148 about its pivot and thereby reciprocate the slide 92 with rotation of cam 125.

Figure 11:
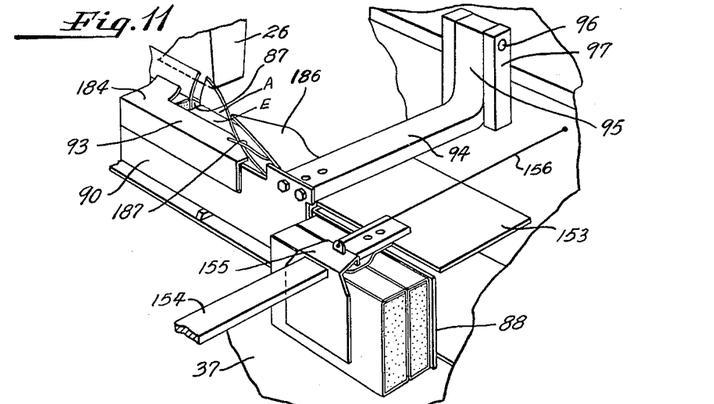
Fig. 11 is a perspective view showing the folder and the stacking mechanism.
Figure 12:
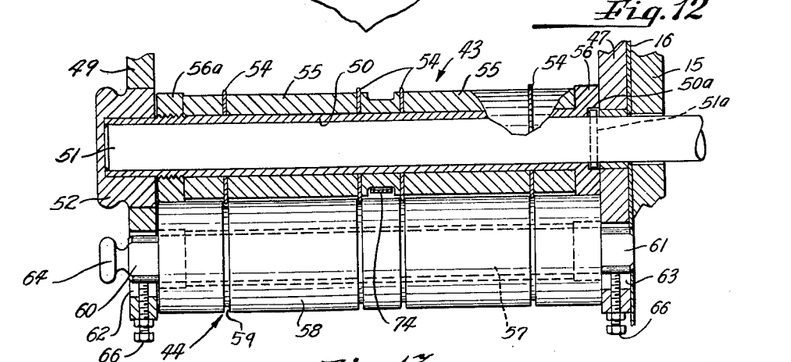
Fig. 12 is a section through the perforator rolls when on the line 12—12 of Fig. 1.

Attached to the bar 94 in spaced relation to the bottom plate and adapted to overlie the bars carried thereon is an upper plate 153 (Fig. 11). Attached to the plate 153 and extending out over the stacking tray 37 is a slide bar 154. Slidable on the bar 154 is a depending abutment member 155 having a depending face portion against which the end bar of a stack abuts and which serves to retain the end bar in upright position and the bars of the stack in compact arrangement. The abutment member is urged toward the inner side of the stacking tray 37 by means of a cable 156 carrying a weight 157 or by analogous means. A trip arm 158 (Fig. 18) is positioned at the edge of the stacking tray 37 for actuation when the stack is complete, the lever being pivotally mounted at 159 whereby outward movement of the lever forces the opposite end 161 against a plunger of an electric switch 162 supported on conduit 163 mounted in the front wall of the housing. The switch is connected to an electrically operated latch 164 by electric leads 165. The electrically operated latch 164 is mounted on a bracket 166 attached to a shaft 167 passing through the front wall of the housing and having bearing support therein and in the rear wall of the housing as shown at 168 (Figs. 3 and 4). The latch includes a solenoid 169 (Fig. 17), the armature of which is connected to a plunger 171 slidably mounted in the bracket 166 to be projected outwardly toward the right facing Fig. 17 when the solenoid is energized, a spring 172 retracting the plunger 171 to the full line position when the solenoid is de-energized. Rotatable on the shaft 167 adjacent the bracket 166 is a follower arm 173 having a cam follower 174 bearing against the periphery of a cam 170 on the output shaft of the gear box which is shaped to rotate the follower arm 173 about the shaft in a vertical plane. A spring 175 retains the cam follower against the cam. A spring 176 of lesser strength than spring 175 retains the bracket 166 and the shaft 167 in the elevated position best shown in Fig. 7. As the cam 170 rotates in the formation of successive bars the follower 174 drops into the low point of the cam and the follower arm 173 rotates idly on the shaft 167. However, when the stack of bars is completed so that the end of the stack rotates the arm 158 to close the switch and energize the latch 164, the plunger 172 moves to a projected position under the arm 173 so that as the follower moves into the low point of the cam 170 the shaft 167 is rotated in a working stroke by spring 175. Attached to the shaft 167 in spaced relation to the face of the front wall are upstanding rods 177 which carry a stack ejecting plate 178, the rods supporting the plate adjacent one edge and the opposite edge of the plate resting upon the stacking tray 37. It will therefore be seen that when the requisite number of bars have been stacked on the tray 37 sufficient to actuate the arm 158, the cam 170 and associated mechanism functions to move the plate 178 toward the right facing Fig. 18 a distance sufficient to slide a predetermined number of the endmost bars laterally of the tray 37 out of the path of the forming stack to a cartoning station or other point of disposal.

*Operation*

Operation of the unit is initiated by actuation of a switch lever 181 (Fig. 2) on the forward side of the front wall which is connected to a conventional enclosed switch 181a feeding power to the motor 98 which runs continuously. The paper or other sheet material is then fed from the roll 39 between the perforating rolls 43 and 44, over the plate 45 and through the opening in the cutter 46. Rotation of the perforating rolls serves to perforate the strip of paper along spaced lines determined by the spacing of the perforating disks in the upper roll and also serves to feed the material from the stock roll 39 through the cutter and under the fingers 77—79 which press the central portion of the sheet against the bottom plate, the edges of the sheet being deflected upwardly by the elements 85 as the sheet is advanced. The cutter serves (at the start of a subsequent cycle) to sever from the strip a blank of suitable length the rear end of which, when severed, drops down onto the bottom plate just ahead of one of the cross bars 36 so that the severed blank is retained substantially as shown in Fig. 7. This brings the sheet material into position where productive operation of the machine may be initiated. At this point ice cream in semi-plastic or form-retaining characteristics is introduced to the nozzle 26 preferably directly from a continuous type freezer, or the nozzle is connected to the source of other material to be used in the machine.

Figure 14:
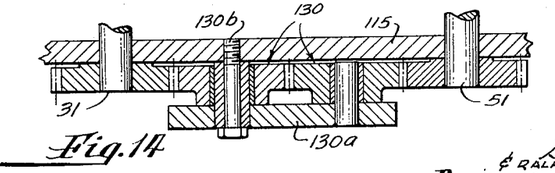
Fig. 14 is a section through the gear train driving the perforator rolls.
Figure 15:
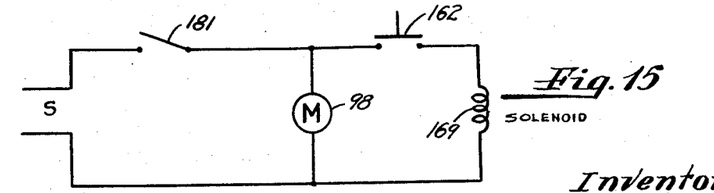
Fig. 15 is a wiring diagram.

Certain of the successive steps in the operation are shown in Figs. 14 through 24, the position of Fig. 14 being more or less arbitrarily chosen as the starting point of the cycle. In this position of the parts the conveyor is at rest and suitable covering material which may be separate cover members but which in the embodiment shown compriss a wrapper of U-shaped cross section, is disposed below the nozzle, the wrapper comprising side panels or covers A and B for covering the flat sides of the bar, a bottom connecting panel C and one or more top panels D and E (see Fig. 10), the panels being connected by perforated fold lines. In this position ice cream as shown at F has filled the space between the covers A and B. It will be seen from the position of the crank arm 109 that the rack 112 occupies its uppermost position and the cam follower 141 rests within one of two rest points 182 in the cam track 131 located 180 degrees apart. This holds the plate 146 in the position shown in Fig. 18 and the rod 89 in its retracted position. Likewise the cam 125 occupies the position shown in Fig. 20 which acts through the cam follower 126 and associated parts to retain the slide 92 and the transfer plate in its retracted position toward the right facing Fig. 18 with the forming portion 87 in a position to support the cover A of the wrapper adjacent one side of the nozzle. Upon rotation of the shaft 108 from the position of Fig. 18, the rack 112 starts its downward movement, thereby rotating the pinion 113 and the attached cam 125 in a clockwise direction. During this movement the pinion turns with respect to the ratchet cam 117 (and the parts driven by the shaft 31 are at rest) but drives the cam 128 in a clockwise direction through the cam pin 127. During the early portion of this rotation the cam follower 141 moves along a helical portion of the cam track 131 into one of the lands indicated at 183 thereby rotating the shaft 138 and the plate 146 in a counterclockwise direction forcing the rod 89 and the transfer plate to the advanced position shown in Fig. 19. In the course of this movement the forming portion 87 moves the filled wrapper crosswise of the mouth of the nozzle, the top panel D of the wrapper folding down to a horizontal position and sliding across the mouth of the nozzle to shear the advancing ribbon of ice cream. During the course of this movement the wrapper moves under a first flap folder 184 (see Fig. 11), the upstanding flap E engaging against the edge of this folder plate and moving down across the top of the package as the bar moves into position beneath the flat folder. Simultaneously with this movement of the transfer plate the bar stacking portion 88 thereof acts to move a wrapped bar from the bottom plate 28 onto the stacking tray 37 as will be noted from a comparison of Figs. 18 and 19.

In response to the aforesaid movement of the crank 139 and follower 141 the arm 142 is rotated depressing the link 143 and the lever 144 thereby rotating the cutter 72 in counterclockwise direction facing Figs. 6 and 7 so that the sheet is sheared by this cutter against the forward edge of the plate 45 to sever the next succeeding blank, the rear edge of the blank dropping down onto the bottom plate 28 just forward of one of the cross bars 36 as shown in Fig. 7.

Figures 21, 22:
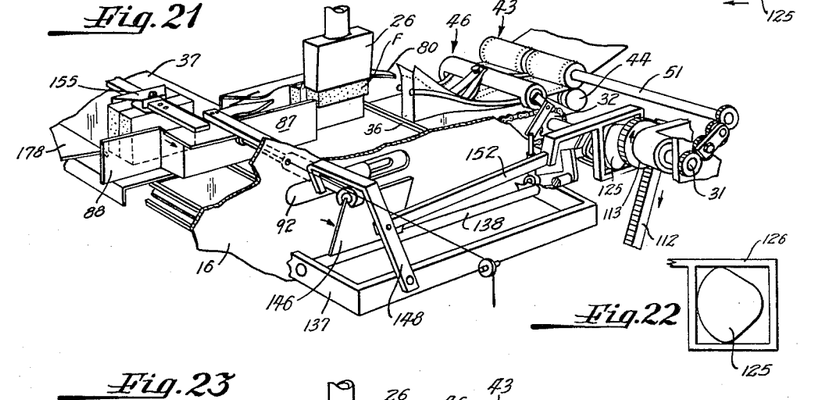

The cam 128 continues to rotate with the follower 141 moving along the land 183 bringing the cam 125 and follower 126 into the position shown in Fig. 22 which acts to advance the slide 92 and move the transfer plate longitudinally of the conveyer until the end of the forming portion 87 passes beyond the plane of the nozzle. At this point in the rotation of the cam 128 the follower 141 has reached the end of the land 183 and moves along the helical portion of the cam into the next dwell point 182 thereby rotating the shaft 138 in a clockwise return movement to move the transfer plate back toward the front face of the cabinet and into the position of Fig. 23.

During the course of the above described operations the cam 170 also rotates through 180° allowing the follower 174 to drop into cam depression 185 (Fig. 18) under the action of spring 175. Since the solenoid 164 is de-energized the arm 173 rotates on the shaft 167 through an idle motion. The rack and pinion and the cam 128 are so interrelated that the cam turns on the shaft 31 through 180° while the crank 109 travels 180° so that the follower 141 reaches one of the rest points 182 when the crank starts the second half of its rotation and the rack 112 reverses its direction of motion.

The rack now moves upwardly rotating pinion 113 in a counterclockwise direction, whereupon the ratchet pin 127 releases cam 129 and the pin 119 engages the teeth of ratchet cam 117 causing this cam and the shaft 31 to which it is affixed to rotate with the pinion. The leaf spring 135 prevents return motion of cam 129 due to friction, and the parts driven thereby remain at rest while the rack moves up. During the upward movement of the rack the shaft is rotated through 180° turning sprocket 32 and advancing the conveyer a distance equal to the distance between two of the cross bars 36 to bring a wrapper into position at the nozzle.

Figures 23, 24:
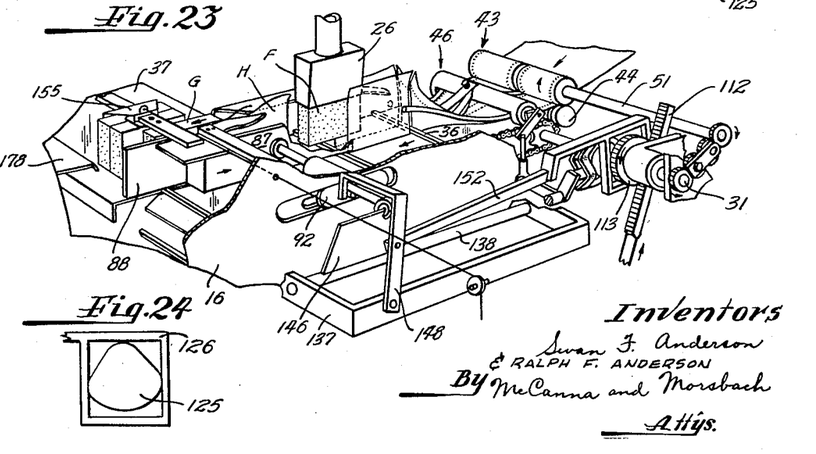

This advancement of the conveyer also acts to move the bar from its position beside the nozzle and under the first flap folder 184 into a position under a second flap folder 186 (see Fig. 2). During the course of this movement the upstanding flap A of the wrapper enters a slot 187 between the first and second flap folders so that the folder 186 displaces the flap downward folding it on top of the flap E. Movement of the bar into this position is illustrated in Fig. 23 from which it will be seen that a previously wrapped bar indicated at G is in the course of movement to a position for entry into the stack during the next succeeding cycle and the bar in process of wrapping indicated at H is in the course of movement to a position under the second flap folder.

Likewise with this rotation of the shaft and the concurrent forward movement of the conveyer, the gear 132 brings about rotation of shaft 51 and of the perforating roll attached thereto which draws sheet material from supply roll 39, feeds it through the cutter 46 while perforating the sheet, brings the forward end of the strip under fingers 77—79 onto the bottom plate 28 while the erecting arms 85 elevate the side portions of the sheet.

Figures 19, 20:
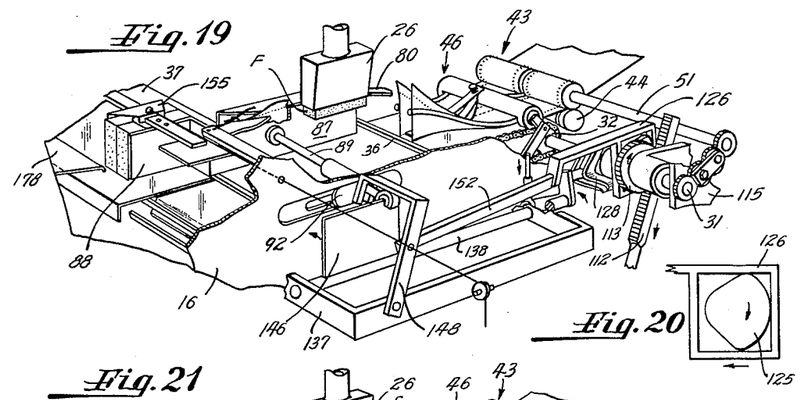

While the pinion 113 moves in a counterclockwise direction through 180°, the cam 125 attached thereto returns from the position of Fig. 22 to the position shown in Fig. 20, thereby moving the slide 92 and the transfer plate back to the position of Fig. 18. It will be noted from a comparison of Figs. 22 and 24 that no movement of the follower 126 occurs until the cam has rotated about 45°, thereafter the follower is moved through its stroke during the next few degrees of cam rotation and no motion thereof occurs in the final portion of cam rotation.

The speed of the machine is adjusted by means of the crank 103 and the rate of flow through the nozzle is coordinated therewith so that the bar is severed when the extruded ribbon fills the wrapper. The cycle repeats to form a continuous succession of wrapped bars.

The bars are moved onto the stacking tray one at a time by the bar stacking portion of the transfer plate and accumulate in a stack, the bars being retained in snug relationship by the abutment member 155 which slides along the bar 154 until it engages the trip arm 158 to close switch 162 and energize solenoid 164 thereby projecting the plunger 171 to a position beneath the arm 173. Thereafter when the follower 174 drops into the depression in cam 170 the shaft 167 is rotated by the spring 175 to move the stack ejecting plate 178 across the tray 37 and thereby move a portion of the stack to one side for manual packaging, boxing or onto a conveyer or the like as shown in Fig. 9. When the ejecting plate 178 moves to the position of Fig. 9 the weight 157 and cable 156 draw the abutment member back along the slide bar into contact with the end bar of the growing stack.

We claim:

1. A bar forming machine comprising a nozzle for extruding a ribbon-like web of plastic material having the cross sectional shape of the bar, means for feeding covers of sheet material edgewise in a direction parallel to the side of the web and transverse to the direction of movement of the web to a bar forming station alongside the web beyond the end of the nozzle, and means positioned to bear against a cover to move the cover crosswise of the nozzle in a direction transverse to the direction of movement of the covers to the bar forming station to thereby shear a bar of the plastic material from the web.

2. A bar forming machine comprising a nozzle for extruding a ribbon-like web of plastic material having the cross sectional shape of the bar, means for feeding a U-shaped wrapper of sheet material edgewise in a first direction parallel to the sides of the web and transverse to the direction of movement of the web to a position below the nozzle, means positioned to bear against one of the sides of the wrapper to move the same crosswise of the nozzle in a second direction transverse to said first direction of movement of the wrapper and shear a bar of the material from the web between one edge of the wrapper and the end of the nozzle.

3. A bar forming machine comprising a downwardly opening nozzle for extruding a flowing ribbon-like web of material having the cross sectional shape of the bar, means for supporting a pair of spaced covers in an upright position and for feeding the covers edgewise in a first horizontal direction along the sides of the web to a position below the nozzle, transfer means positioned to bear against one of the covers to move the upper edge thereof crosswise of the nozzle in a second direction transverse to said first horizontal direction and shear a bar of material from the web, the other of said covers having a closure flap thereon, and means positioned to engage said flap as the bar is moved crosswise of the nozzle by said transfer means to fold the flap over the upper edge of the bar.

4. A bar forming machine comprising a downwardly opening nozzle for extruding a flowing ribbon-like web of material having the cross sectional shape of the bar, means for feeding an upright channel-shaped wrapper edgewise in a direction transverse to the first direction of movement of the web to position the opposed sides of the wrapper on opposite sides of the web, and means positioned to bear against one of the sides of the wrapper to move the latter crosswise of the nozzle in a second direction transverse to said first direction and move a bar of the material within said wrapper out of the path of the web.

5. A bar forming machine comprising a downwardly opening nozzle for extruding a flowing ribbon-like web of material having the cross sectional shape of the bar, means for feeding an upright channel-shaped wrapper edgewise in a first direction transverse to the direction of movement of the web to position the opposed sides of the wrapper on opposite sides of the web, means positioned to bear against one of the sides of the wrapper to move the latter crosswise of the nozzle in a second direction transverse to said first direction and move a bar of the material within said wrapper out of the path of the web, the wrapper having closure flaps on the upper ends thereof, and means for folding the flaps over onto the upper edge of the bar after the latter has been separated from the web.

6. A bar forming machine comprising a nozzle for extruding a ribbon-like web of material, a conveyer movable in a direction transverse to the direction of movement of the web, means for feeding a cover to said conveyer for movement thereby in a direction parallel to the sides of the web to a position alongside of the web, and means positioned to bear against the cover and move the same crosswise of the conveyer and across the end of the nozzle to shear a bar of material from the web and move the bar and cover out of the path of the advancing web.

7. A bar forming machine comprising an intermittently movable conveyer for advancing a pair of covers from a loading station to a bar forming station and for simultaneously advancing a formed bar with the covers applied thereto from the forming station to a discharge station, a nozzle at the bar forming station for extruding a ribbon-like web of plastic material, said conveyer advancing the covers from the loading station to a position along opposite sides of the web and below the nozzle, and transfer means positioned to bear against one of the covers at the nozzle for moving the cover crosswise on the conveyer and across the edge of the nozzle to shear a bar of material from the web and move the bar and covers to a displaced position on the conveyer out of the path of the advancing web.

8. A bar forming machine comprising an intermittently movable conveyer for advancing a pair of covers from a loading station to a bar forming station and for simultaneously advancing a formed bar with the covers applied thereto from the forming station to a discharge station, a nozzle at the bar forming station for extruding a ribbon-like web of material, said conveyer advancing the covers from the loading station to a position along opposite sides of the web below the nozzle, transfer means positioned to bear against one of the covers at the nozzle for moving the same crosswise on the conveyer and across the edge of the nozzle to shear a bar of material from the web and move the bar and covers to a displaced position on the conveyer out of the path of the advancing web, and means carried by said transfer means for simultaneously engaging a bar at the discharge station to move the bar thereat off the conveyer.

9. A bar forming machine comprising an intermittently movable conveyer for advancing a pair of covers from a loading station to a bar forming station and for simultaneously advancing a formed bar with the covers applied thereto from the forming station to a discharge station, a nozzle at the bar forming station for extruding a ribbon-like web of material, said conveyer advancing the covers from the loading station to a position along opposite sides of the web and below the nozzle, transfer means positioned to bear against one of the covers at the nozzle for moving the covers and a bar of the web material disposed therebetween crosswise of the conveyer and across the end of the nozzle to a displaced position on the conveyer out of the path of the advancing web, and folding means for deflecting a part of said covers to close an open side of the wrapper formed by the covers in the course of movement of the bar and covers by said transfer means.

10. A bar forming machine comprising an intermittently movable conveyer for advancing a wrapper from a loading station to a bar forming station and for simultaneously advancing a wrapped bar from the forming station to a discharge station, a nozzle at the bar forming station for extruding a ribbon-like web of material, means at the loading station for feeding a channel-shaped wrapper having a bottom panel, side covers and closure flaps on the edges thereof opposed to the bottom panel, the conveyer advancing the wrapper edgewise from the loading station to the forming station to position the covers of the wrapper on opposite sides of the web, transfer means positioned to bear against one of the covers of the wrapper to move the wrapper and a bar of the material within said wrapper crosswise of the nozzle to a displaced position on the conveyer out of the path of the advancing web, means positioned to engage the closure flap on the other cover of the wrapper to fold the latter over onto the upper edge of the bar in response to movement of the bar and wrapper by said transfer means, and means positioned to engage the closure flap on said one cover of the wrapper as the bar and wrapper are moved by the conveyer from the forming station to the discharge station for folding the flap onto the top of the bar.

11. A bar forming machine comprising an intermittently movable conveyer for advancing a wrapper from a loading station to a bar forming station and for simultaneously advancing a wrapped bar from the forming station to a discharge station, a nozzle at the bar forming station for extruding a ribbon-like web of material, means at the loading station for feeding a channel-shaped wrapper having a bottom panel, side covers and closure flaps on the edges of the covers opposed to the bottom panel, the conveyer advancing the wrapper edgewise from the loading station to the forming station to position the covers of the wrapper on opposite sides of the web, transfer means positioned to bear against one of the covers of the wrapper to move the wrapper and a bar of the material within said wrapper crosswise of the nozzle to a displaced position on the conveyer out of the path of the advancing web, means positioned to engage the closure flap on the other cover of the wrapper to fold the latter over onto the upper edge of the bar in response to movement of the bar and wrapper by said transfer means, means positioned to engage the closure flap on said one cover of the wrapper as the bar and wrapper are moved by the conveyer from the forming station to the discharge station for folding the flap onto the top of the bar, said wrapper feed means including feed rolls for feeding a strip of wrapping material onto the conveyer, cutter means for severing the end segments from the strip of wrapping material to form blanks for advancement on the conveyer, and means located between the cutter and the nozzle for deflecting the sides of the blanks upwardly to form a channel-shaped wrapper.

12. A bar forming machine comprising an intermittently movable conveyer for advancing a wrapper from a loading station to a bar forming station and for simultaneously advancing a wrapped bar from the forming station to a discharge station, a nozzle at the bar forming station for extruding a ribbon-like web of material, means at the loading station for feeding a channel-shaped wrapper having a bottom panel, side covers and closure flaps on the edges thereof opposed to the bottom panel, the conveyer advancing the wrapper edgewise from the loading station to the forming station to position the covers of the wrapper on opposite sides of the web, transfer means positioned to bear against one of the covers of the wrapper to move the wrapper and a bar of the material disposed within said wrapper crosswise of the nozzle to a displaced position on the conveyer out of the path of the advancing web, means positioned to engage the closure flap on the other cover of the wrapper to fold the latter over onto the upper edge of the bar in response to movement of the bar and wrapper by said transfer means, means positioned to engage the closure flap on said one cover of the wrapper as the bar and wrapper are moved by the conveyer from the forming station to the discharge station for folding the flap onto the top of the bar, said wrapper feed means including feed rollers for feeding a strip of wrapping material onto the conveyer, said rolls having means for scoring the strip of wrapping material along fold lines between the bottom panel and the covers and between the covers and the closure flaps of the wrapper, cutter means for severing the end segments of the strip of wrapping material to form a blank for advancement on the conveyer, and means positioned in the path of the strip of wrapping material advanced by feed rolls for bending the sides upwardly to form a channel-shaped wrapper.

13. A bar forming machine comprising an intermittently movable conveyer having longitudinally spaced elements thereon, a dispenser located intermediate the ends of the conveyer having a discharge opening, means for advancing a strip of wrapping material onto the conveyer and in the direction of movement thereof, means operated in timed relation with the intermittently advanced conveyer for severing an end segment of the strip of wrapping material having a length less than the spacing between the elements on the conveyer to form a blank for advancement by the conveyer to a position adjacent the dispenser, means for deflecting the side portions of the blank as it is advanced by the conveyer to form an open-ended channel-shaped wrapper and to position the opposed sides of the wrapper at opposite sides of the discharge opening, and means positioned to bear against one of the sides of the wrapper to move the latter crosswise of the discharge opening.

14. A bar forming machine comprising an intermittently movable conveyer having longitudinally spaced elements thereon, a nozzle located intermediate the ends of the conveyer for extruding a ribbon-like web of material, means for advancing a strip of wrapping material onto the conveyer and in the direction of movement thereof, said strip advancing means including feed rolls having rows of teeth on the periphery thereof for scoring fold lines on the strip passing thereby, means operated in timed relation with the intermittently advanced conveyer for severing an end segment of the strip of wrapping material having a length less than the spacing between the elements on the conveyer to form a blank for advancement on the conveyer to a position adjacent the nozzle, means for deflecting the side portions of the blank as it is advanced by the conveyer to form an open-ended channel-shaped wrapper and to position the opposed sides of the wrapper at opposite sides of the web, and means positioned to bear against one of the sides of the wrapper to move the latter crosswise of the nozzle and move a bar of the material disposed within said wrapper out of the path of advance of the web.

15. A bar forming machine comprising an intermittently movable conveyer having longitudinally spaced elements thereon, a dispenser located intermediate the ends of the conveyor having a discharge opening, feed means for advancing a strip of wrapping material onto the conveyor and in the direction of movement thereof, means operated in timed relation with the intermittently advanced conveyor for severing an end segment of the strip of wrapping material having a length less than the spacing between the elements on the conveyor to form a blank for advancement by the conveyor to a position adjacent the nozzle, means arranged in the path of movement of the strip advanced by said feed means for partially deflecting the sides of the strip as it is advanced by the feed means and before the segment is severed from the strip and for thereafter further deflecting the side portions of the severed blank as it is advanced by the conveyor to form an open-ended channel-shaped wrapper and position the opposed sides of the wrapper at opposite sides of the discharge opening of said dispenser, and means positioned to bear against one of the sides of the wrapper to move the latter crosswise of the conveyer and away from said dispenser.

16. A bar forming machine comprising means including a nozzle for continuously extruding a ribbon-like web of material, conveyer means for feeding a cover in a direction transverse the direction of movement of the web from the nozzle to a position along one side of the web beyond the edge of the nozzle, transfer means engageable with the cover to move the latter crosswise of the nozzle to shear a bar from the web, said transfer means including a plate, a first operating means for reciprocating the plate crosswise of the nozzle from a retracted position to an extended position and back, and a second operating means operated in timed relation with said first operating means for reciprocating the plate in a direction transverse the direction of reciprocation of the plate by the first operating means to move the plate out of the path of the flowing web while the plate is being returned from its extended position to its retracted position.

17. A bar forming machine having a loading station, a bar forming station and a discharge station, means including a downwardly opening nozzle at the forming station for continuously extruding a flowing web of plastic confection, a horizontally movable intermittently operated conveyor for advancing a cover from the loading station to a position along one side of the web at the forming station and for simultaneously advancing a formed bar with the cover applied thereto from the forming station to the discharge station, and transfer means engageable with the cover at the forming station for moving the cover crosswise of the nozzle to sever a bar from the web and move the bar to a displaced position on the conveyer, said transfer means simultaneously engaging the cover of a formed bar at the discharge station to discharge the bar from the conveyer.

18. A bar forming machine having a loading station, a bar forming station and a discharge station, means including a downwardly opening nozzle at the forming station for continuously extruding a flowing web of plastic confection, a horizontally movable intermittently operated conveyor for advancing a cover from the loading station to a position along one side of the web at the forming station and for simultaneously advancing a formed bar with the cover applied thereto from the forming station to the discharge station, transfer means engageable with the cover at the forming station for moving the cover crosswise of the nozzle to sever a bar from the web and move the bar to a displaced position on the conveyer, said transfer means simultaneously engaging a formed bar at the discharge station to discharge the bar from the conveyer, a horizontal platform at the discharge station for receiving formed bars, means for stacking the bars on the platform as the bars are discharged from the conveyer, and ejector means operated in response to the accumulation of a predetermined number of bars in the stack on the platform for ejecting a group of formed bars from the platform.

19. A bar forming machine comprising a nozzle for continuously extruding a web of plastic confection, means for supporting a cover in an upright position and for feeding the cover to a position along one side of the web, means engageable with the cover positioned at one side of the web for moving the cover crosswise of the nozzle to sever a bar from the web and move the bar and cover out of the path of the advancing web, means for stacking the bars in side-by-side relation as they are formed by the machine, means for ejecting a group of said bars from the stack, and means responsive to the accumulation of a predetermined number of bars in said stack for operating said ejector means.

20. A bar forming machine comprising a horizontally disposed platform, a conveyer having a plurality of spaced elements overlying the platform and movable thereacross, a dispenser overlying the platform for dispensing a confection, means for feeding a strip of wrapping material onto the platform in the direction of movement of the conveyer thereacross, cutter means overlying said platform operable to sever a blank from the end of the strip, forming means disposed between said dispenser and the cutter means and spaced from the latter a distance less than the spacing between said elements on the conveyer for deflecting the side portions of the strip upwardly and for depressing the central portion of the strip into engagement with the platform to form a U-shaped channel, and means for operating the strip feeding means, the cutter, and the conveyer in timed relation whereby the strip feeding means operates to partially advance the strip past said forming means and said conveyer operates after the blank is severed from the strip to continue the advance of the severed blank past the forming means to the dispenser.

21. A bar forming machine comprising means including a nozzle for continuously extruding a web of plastic confection, means including a conveyer movable in a direction transverse the direction of flow of the web from the nozzle for advancing a wrapper to a position beyond the end of the nozzle, transfer means for moving the wrapper transverse the direction of movement of the conveyer and crosswise of the nozzle to sever a bar from the web, and drive means for alternately operating said conveyer and said transfer means.

22. A bar forming machine comprising means including a nozzle for continuously extruding a web of plastic confection, means including a conveyer for advancing a wrapper to a position beyond the end of the nozzle, transfer means for moving the wrapper crosswise of the nozzle to sever a bar from the web, drive means for alternately operating said conveyer and said transfer means, said drive means including a rack and pinion, a first ratchet mechanism operative in response to movement of the rack in one direction to move the conveyer to advance a wrapper to the nozzle, and a second ratchet mechanism operative in response to movement of the rack in the opposite direction for operating said transfer means.

23. A bar forming machine comprising a dispenser, a conveyer movable past the dispenser for intermittently advancing blanks of wrapping material to the nozzle, means for feeding a strip of wrapping material onto the conveyer in the direction of movement thereof, means for cutting end segments from the strip to form blanks and deposit the blanks on the conveyer, drive means including a rack and pinion, a first ratchet means responsive to movement of the rack in one direction for operating said strip feed means and said conveyer, a second ratchet means responsive to movement of the rack in the opposite direction for operating said cutter means, and means for reciprocating said rack.

24. A bar forming machine comprising a nozzle for extruding a web of material, means including a conveyer movable past the nozzle for advancing a cover to a position along one side of the web beyond the end of the nozzle, means for feeding a strip of wrapping material onto the conveyer and in the direction of movement thereof, means for cutting end segments from the strip to form covers and for depositing the covers on the conveyer to be carried thereby to the nozzle, means for severing a bar from the web including transfer means engageable with the cover at the nozzle for moving the cover crosswise of the nozzle, drive means for said machine including a rack and pinion, a first ratchet means operatively connected to said pinion and responsive to movement of the rack in one direction for operating said strip feed means and said conveyer, a second ratchet means operatively connected to said pinion and responsive to movement of the rack in the opposite direction for operating said cutter means and said transfer means, and motor means for reciprocating said rack.

25. The combination of claim 24 wherein said transfer means is movable in a direction transverse the direction of movement of the conveyer to move the severed bar out of the path of the flowing web to a displaced position on the conveyer, said second ratchet means including cam means for moving said transfer means transversely of said conveyer in response to movement of said rack in said opposite direction.

26. The combination of claim 24 wherein said feed means includes a feed roll, means operatively connecting said feed roll to said first ratchet means to be rotated thereby, said cutter means including a rotatably supported semi-cylindrical cutter member overlying said conveyer, a plate extending from said feed roll to said cutter means and bearing against the periphery of said cutter means to guide the strip from the roll to the cutter and to cooperate with the cutter member to sever the end segment from the strip as the cutter member is rotated about its axis, and cam means operatively connecting said cutter member to said second ratchet means to be rotated thereby.

27. In a bar forming machine comprising a dispenser having a discharge opening, a conveyer for advancing a cover to a position adjacent one side of said discharge opening, transfer means positioned to engage the cover positioned at the dispenser and operative to move the cover crosswise of the conveyer away from said dispenser discharge opening, a drive shaft for the conveyer, a pinion loose on the conveyer drive shaft, ratchet means connecting the conveyer drive shaft to the pinion for rotation therewith in one direction of rotation of the pinion, cam means loose on said conveyer drive shaft and connected to said transfer means for operating the latter in response to rotation of the cam means, ratchet means connecting the cam means to the pinion for rotation therewith when the pinion is rotataed in the other direction, a rack engaging said pinion for rotating the latter alternately in opposite directions, in response to reciprocation of the rack, and means for cyclically reciprocating the rack.

28. In a bar forming machine comprising a dispenser having a discharge opening, a conveyer for advancing a cover to a position along one side of the web, transfer means positioned to engage the cover positioned at the dispenser and operative to move the cover crosswise of the conveyer away from said dispenser discharge opening, feed means having a shaft operative in response to rotation of the shaft for feeding covers onto the conveyer, a drive shaft for the conveyer, a pinion loose on the conveyer drive shaft, ratchet means connecting the conveyer drive shaft to the pinion for rotation therewith in one direction of rotation of the pinion, cam means loose on said conveyer drive shaft and connected to said transfer means for operating the latter in response to rotation of the cam means, ratchet means connecting the cam means to the pinion for rotation therewith when the pinion is rotated in the other direction, means drivingly connecting the shaft for said feed means to said conveyer drive shaft for rotation thereby, a rack engaging said pinion for rotating the latter alternately in opposite directions in response to reciprocation of the rack, and means for cyclically reciprocating the rack.

29. In a bar forming machine comprising a dispenser having a discharge opening, a conveyer for advancing a cover to a position adjacent said dispenser discharge opening, transfer means positioned to engage the cover positioned at the dispenser and operative to move the cover crosswise of the conveyer away from the discharge opening, feed means having a shaft operative in response to rotation of the shaft for feeding covers onto the conveyer, a drive shaft for the conveyer, a pinion loose on the conveyer drive shaft, ratchet means connecting the conveyer drive shaft to the pinion for rotation therewith in one direction of rotation of the pinion, cam means loose on said conveyer drive shaft and connected to said transfer means for operating the latter in response to rotation of the cam means, ratchet means connecting the cam means to the pinion for rotation therewith when the pinion is rotated in the other direction, means drivingly connecting the shaft for said feed means to said conveyer drive shaft for rotation thereby, a rack engaging said pinion for rotating the latter alternately in opposite directions in response to reciprocation of the rack, a motor, means driven by the motor for cyclically reciprocating said rack, and means for selectively varying the rate of reciprocation of said rack to thereby simultaneously vary the rate of advance of the conveyer and the rate of operation of the feed means and the transfer means.

30. In a bar forming machine comprising a nozzle for extruding a web of plastic confection, a conveyer movable in a direction transverse the direction of movement of the web, means for feeding a cover onto the conveyer for movement thereby to a position along one side of the web, transfer means positioned to bear against the cover positioned alongside the web, a drive shaft connected to said conveyer, a pinion loosely mounted on said drive shaft, ratchet means connecting said drive shaft to said pinion for rotation therewith in one direction of rotation of the pinion, means connected to said transfer means and including a first cam loosely mounted on said drive shaft operative in response to rotation of the first cam for moving said transfer means in one direction crosswise of the nozzle, means connected to said transfer means including a second cam loosely mounted on said shaft operative in response to rotation of the second cam for moving said transfer means in a direction transverse said one direction of movement of the transfer means out of the path of the flowing web, ratchet means connecting said first cam to said pinion for movement therewith in the other direction of rotation of the pinion, means connecting said second cam to said pinion for movement therewith, and means for rotating said pinion alternately in opposite directions.

31. In a bar forming machine comprising a downwardly opening nozzle for extruding a web of plastic confection, a horizontally movable conveyer disposed below said nozzle for feeding a cover to a position along one side of the web, transfer means for moving the cover across the end of the nozzle, said transfer means including a plate positioned to bear against the cover alongside the nozzle, a slide disposed above said conveyer and mounted for horizontal sliding movement in a direction parallel to the direction of movement of the conveyer, a rod attached to said plate and reciprocably mounted on said slide for movement in a horizontal direction transverse the direction of movement of the slide, a drive shaft for the conveyer, a pinion loosely mounted on said drive shaft, ratchet means connecting said pinion to said drive shaft for movement therewith in one direction of rotation of the pinion, means including a first cam loosely mounted on said drive shaft for reciprocating said rod relative to said slide in response to rotation of the first cam to move the plate across the end of the nozzle, means including a second cam loosely mounted on said drive shaft for reciprocating said slide and the rod carried thereby, ratchet means connecting said first cam to said pinion for movement therewith in the other direction of rotation of the pinion, means connecting said second cam means to said pinion for rotation therewith, and means including a rack for rotating said pinion alternately in opposite directions.

32. A bar forming machine comprising a nozzle for extruding a web of plastic confection, means operative to advance a cover to a position alongside the web beyond the end of the nozzle, transfer means positioned to bear against the cover alongside the web and operative to move the cover across the nozzle, means operative to stack the severed bars, drive means including a motor for operating said cover advancing means, said transfer means and said stacking means in timed relation to each other, an ejector positioned to engage the bars in the stack and operative to eject a group of formed bars from the stack, ejector operating means connected to said drive means for operation in timed relation therewith, clutch means actuatable to operatively connect said operating means to said ejector, and means responsive to the accumulation of a predetermined number of bars in the stack for actuating said clutch means.

33. A bar forming machine comprising a nozzle for extruding a web of plastic confection, means operative to advance a cover to a position alongside the web, transfer means positioned to bear against the cover alongside the web and operative to move the cover across the nozzle to sever a bar from the web, means operative to stack the severed bars, drive means including a motor for operating said cover advancing means, said transfer means and said stacking means in timed relation, an ejector positioned to engage the bars in the stack and operative to eject a group of formed bars from the stack, a cam connected to said drive means for rotation thereby in timed relation with the operation of the stacking means, a shaft connected to said ejector for operating the ejector in response to oscillation of the shaft, follower means loosely mounted on said shaft and engaging said cam, clutch means actuatable to drivingly connect said follower means to said shaft to oscillate the shaft as the cam rotates, and means responsive to the accumulation of a predetermined number of bars in the stack for actuating the clutch means.

34. A wrapping machine including a dispenser for dispensing a confection, a conveyer for advancing wrappers to the dispenser, means for feeding wrappers to the conveyer comprising feed rolls for feeding a strip of sheet material, a rotary cutter disposed between the feed rolls and the conveyer, said cutter having cylindrical end portions, a shear plate extending between the feed rolls and the cutter for guiding the strip from the rolls to the cutter, means for rotatably supporting the end portions of the cutter and for supporting one end of the shear plate in contact with the end portions of the cutter to cooperate the cutter to shear a segment from the strip when the cutter is rotated, means disposed between the cutter and the nozzle for pressing the strip into engagement with the conveyer, and means for rotating said cutter to sever an end segment from the strip and form a wrapper for advancement by the conveyer.

35. A wrapping machine including a dispenser for dispensing a confection, a conveyer for advancing a wrapper to the dispenser, means for feeding wrappers to the conveyer comprising feed rolls for feeding a strip of sheet material onto the conveyer, one of said rolls having a plurality of longitudinally spaced rows of teeth for forming score lines on the strip, a rotary cutter located between the feed rolls and the nozzle, a shear plate extending from the feed rolls to the cutter for guiding the strip to the cutter, said cutter including an elongated outer body having an opening intermediate the ends thereof for the passage of the strip therethrough, a semi-cylindrical cutter member disposed in said outer body and having cylindrical end portions rotatably mounted in the body, means on the body for supporting one end of the shear plate in contact with the end portions of the cutter member, a stripper attached to the outer body and extending between said one of said rolls and the strip of material to separate the strip from the scoring teeth and to guide the strip to the cutter, a plurality of resilient fingers attached to the outer body for pressing the central portion of the strip into engagement with the conveyer as the strip emerges from the cutter, means for rotating the cutter member relative to the shear plate to sever an end segment from the strip and form a blank for advancement by the conveyer, and means located between the cutter and the dispenser for deflecting the side portions of the blank upwardly as the latter is advanced by the conveyer to the dispenser to form a channel-shaped wrapper.

36. A bar forming machine comprising a housing having a front panel, a nozzle mounted on said front panel for extruding a web of plastic material, bar forming and wrapping means including a plurality of shafts extending out of said housing through said front panel, a conveyer extending between a pair of said shafts externally of said housing for advancing a wrapper to the nozzle, a feed roll for feeding a strip of wrapping material onto the conveyer mounted on another of said shafts externally of said housing, cutter means mounted on said front panel for severing end segments of the strip of wrapping material to form wrappers for advancement by the conveyer, transfer means positioned to engage a wrapper at the nozzle to move the wrapper crosswise of the nozzle and sever a bar from the web, a rod attached to said transfer means and extending through said front panel into said housing, and drive means located within the housing comprising a motor and gear mechanism for driving the cutter means, the conveyer means, the feed means and the transfer means in timed relation, said housing enclosing the drive means against the entrance of water and steam applied to the forming and wrapping means during sterilization of the latter.

37. In a wrapping machine, a dispenser, means for forming and feeding a wrapper to the dispenser, said last mentioned means including a pair of feed rolls for feeding a strip of sheet material and for forming score lines thereon, one of said rolls having a plurality of longitudinally spaced grooves in the periphery thereof, the other of said rolls comprising a sleeve having a plurality of toothed scoring elements thereon extending into the grooves in said one roll and spacers disposed on the sleeve between the scoring elements, a pair of feed roll support brackets, means mounting said other roll on said brackets including a bearing cap rotatably receiving one end of said sleeve and having an external diameter greater than the diameter of the scoring elements, said bearing cap being removably mounted on one of said brackets whereby said other roll may be withdrawn axially from between the brackets, means adjustably mounting said one roll on said brackets for movement toward and away from said other roll, a cutter located between said feed rolls and the dispenser for severing end segments from the strip, and means located between the cutter and the dispenser for deflecting the side portions of the strip upwardly to form a channel-shaped wrapper.

38. In a wrapping machine, the combination of a conveyer, transfer means for moving an article transversely of the conveyer, drive means for alternately operating said conveyer and said transfer means, said drive means including a rack and pinion, a first ratchet mechanism operative in response to movement of said rack in one direction for moving said conveyer in step fashion to advance an article thereon, and a second ratchet mechanism operative in response to movement of the rack in the opposite direction for operating said transfer means.

39. In a bar forming machine, a nozzle for extruding a web of plastic confection, a conveyer movable below said nozzle to advance a wrapper from a loading station to the bar forming station and for simultaneously advancing a wrapped bar from the forming station to a discharge station, means located adjacent one end of the conveyer for feeding wrappers to the conveyer, transfer means positioned adjacent said nozzle and operative to engage a wrapper thereat to move the wrapper and the plastic confection therein crosswise of the nozzle to a displaced position on the conveyer, discharge means at the discharge station movable in the direction of movement of the transfer means and operative to engage a wrapped bar at the discharge station to move the latter off the conveyer at one side thereof, means at said one side of the conveyer for receiving the bars from the conveyer and for stacking the bars in side-by-side relation, ejector means movable in a direction opposite the direction of movement of the bars by said conveyer and operative to engage the stacked bars to move them out of said stacking means to a position alongside said conveyer at said one side thereof, and means for operating said conveyer; said transfer means; said discharge means, and said ejector means in timed relation.

40. In a bar forming machine, a nozzle for extruding a web of plastic confection, means for feeding an upright channel-shaped wrapper edgewise in a direction transverse the direction of movement of the web to position opposed sides of the wrapper on opposite sides of the web, means positioned to bear against a side of the wrapper to move the latter crosswise of the nozzle and separate a bar of material from the web, a stacking platform, means engageable with a side of the wrapper of a bar as it is formed by the machine for pushing the bar and wrapper sideways onto said platform to form a stack of sidewise aligned bars, an abutment member adapted for engagement with the end bar in the stack, means mounting said abutment member for sliding movement in a direction parallel to the direction of movement of the bars onto the platform, and means for yieldably urging said abutment member in a direction to yieldably compress the stack of formed bars.

References Cited in the file of this patent

UNITED STATES PATENTS

| | | |
|---|---|---|
| 715,620 | Staude | Dec. 9, 1902 |
| 1,545,513 | Peters | July 14, 1925 |
| 1,592,767 | House | July 13, 1926 |
| 1,891,367 | Broderick | Dec. 20, 1932 |
| 2,027,545 | Mapes | Jan. 14, 1936 |
| 2,117,347 | Molins | May 17, 1938 |
| 2,521,403 | Overland | Sept. 5, 1950 |
| 2,576,096 | Blanchett | Nov. 27, 1951 |
| 2,608,038 | Knowlton | Aug. 26, 1952 |
| 2,612,016 | Anderson | Sept. 30, 1952 |
| 2,651,896 | Woodruff | Sept. 15, 1953 |